(12) United States Patent
VanLaningham et al.

(10) Patent No.: US 7,680,092 B2
(45) Date of Patent: Mar. 16, 2010

(54) LINK ADAPTION FOR MOBILE AD HOC AND MESH NETWORKS

(75) Inventors: Steven L. VanLaningham, Richardson, TX (US); Jeffrey A. Barton, Richardson, TX (US); James A. Stevens, Allen, TX (US); C. David Young, Plano, TX (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 798 days.

(21) Appl. No.: 10/589,846

(22) PCT Filed: Feb. 19, 2004

(86) PCT No.: PCT/US2004/004918

§ 371 (c)(1),
(2), (4) Date: Aug. 18, 2006

(87) PCT Pub. No.: WO2005/083953

PCT Pub. Date: Sep. 9, 2005

(65) Prior Publication Data

US 2008/0095222 A1 Apr. 24, 2008

(51) Int. Cl.
*H04B 7/216* (2006.01)
(52) U.S. Cl. .............. 370/342; 370/335; 370/328; 455/509; 342/457; 714/704
(58) Field of Classification Search .............. 370/342, 370/335, 328; 455/509; 342/457; 714/704
See application file for complete search history.

(56) References Cited

U.S. PATENT DOCUMENTS 7,403,780 B2 * 7/2008 VanLaningham et al. 455/452.1
7,466,682 B1 * 12/2008 Ribas et al. ................ 370/342

2003/0222819 A1 * 12/2003 Karr et al. ................... 342/457
2004/0193971 A1 * 9/2004 Soong et al. ................. 714/704
2005/0190718 A1 * 9/2005 Holtzman et al. ........... 370/328
2007/0066330 A1 * 3/2007 Dharia et al. ............... 455/509
2008/0025265 A1 * 1/2008 Soong et al. ................. 370/335

FOREIGN PATENT DOCUMENTS

EP 0 682 419 B1 11/1995
WO WO 00/57574 A1 9/2000

OTHER PUBLICATIONS

International Search Report for PCT/US2004/004918, date of mailing Nov. 30, 2004, 2 pages.

* cited by examiner

*Primary Examiner*—Sudhanshu C Pathak
(74) *Attorney, Agent, or Firm*—Matthew J. Evans; Daniel M. Barbierl

(57) ABSTRACT

A method of selecting linked metric measurements from at least one of open loop and closed loop measurements is disclosed. The method includes sending by a first node a first radio communication and receiving by a second node the first radio communication over a communication link. The method also includes estimating by a second node dynamics of the communication channel using at least one of the variance and mean deviation of linked metric measurements. The link metric measurements are at least one of symbol error rate (SER), packet error rate (PER), frame error rate (FER), bit error rate (BER), signal to noise ration (SNR), and received signal strength (RSS). The method also includes the use of the above link metric measurements by the second node as Open Loop metrics and the sending back of these metrics to the first node for use a Closed Loop metrics by the first node. The method also includes categorizing the dynamics of the communications channel into one of at least two groups based on the estimate. Further still, the method comprises selecting, based on the chosen group, the use of at least one of closed loop link adaption and open loop link adaption of communication link parameters.

32 Claims, 16 Drawing Sheets

| Current State Number | TX Power (dbm) | Modulation (1=4dpsk,2-16-dpsk) | Target SNR for Modulation | Diversity Level | Diversity Type (1=CW,2=Rep) | SNR Div. Combining(0=Max,1=Min,2=Avg) | SER Div. Combining(0=Max,1=Min,2=Avg) | FEC Rate | TPreg > Thresh | Deviation Multiple | State when thresh crossed | TPreg < Thresh | Deviation Multiple | State when thresh crossed | Margin < Thresh | Deviation Multiple | State when thresh crossed | Margin > Thresh | Deviation Multiple | State when thresh crossed |
|---|---|---|---|---|---|---|---|---|---|---|---|---|---|---|---|---|---|---|---|---|
| 1 | 40 | 1 | 15 | 4 | 1 | 0 | 1 | 40 | 1 | 1 | 25 | 1 | 1 | 10 | 1 | 1 | 20 | 1 | 1 | 2 |
| 2 | 40 | 1 | 15 | 4 | 2 | 2 | 0.5 | 40 | 1 | 1 | 25 | 2 | 1 | 15 | 1 | 1 | 25 | 1 | 1 | 3 |
| 3 | 40 | 1 | 15 | 4 | 2 | 2 | 0.5 | 40 | 1 | 2 | 25 | 4 | 1 | 20 | 2 | 1 | 25 | 1 | 1 | 3 |
| 4 | 30 | 1 | 15 | 4 | 2 | 2 | 0.75 | 40 | 1 | 3 | 15 | 4 | 1 | 20 | 3 | 1 | 30 | 1 | 1 | 5 |
| 5 | 40 | 2 | 30 | 4 | 2 | 2 | 0.75 | 40 | 1 | 3 | 25 | 6 | 1 | 25 | 3 | 1 | 100 | 1 | 1 | 5 |
| 6 | 30 | 2 | 30 | 4 | 2 | 2 | 0.91 | 25 | 1 | 5 | 15 | 7 | 1 | 25 | 5 | 1 | 100 | 1 | 1 | 6 |
| 7 | 20 | 2 | 30 | 4 | 2 | 2 | 0.91 | 20 | 1 | 6 | 5 | 8 | 1 | 25 | 6 | 1 | 100 | 1 | 1 | 7 |
| 8 | 10 | 2 | 30 | 4 | 2 | 2 | 0.91 | 15 | 1 | 7 | -5 | 8 | 1 | 25 | 7 | 1 | 100 | 1 | 1 | 8 |

FIG. 7

LINK ADAPTION FOR MOBILE AD HOC AND MESH NETWORKS

REFERENCE TO RELATED PATENT APPLICATIONS

This application is related to U.S. application Ser. No. 10/782,716 entitled HYBRID OPEN/CLOSED LOOP FILTERING FOR LINK QUALITY ESTIMATION which is filed the same day herewith.

BACKGROUND

Highly dense and highly dynamic Mobile Ad Hoc Networks (MANET) often have limited bandwidth available for the measurement and control of link performance parameters. Often, a receiving node can only measure and return link performance parameters to the transmitting node at a rate that constitutes a highly undersampled closed loop control loop with respect to the link dynamics encountered. Undersampling or the need for large control bandwidth to allow for adequate sampling is the bane of many MANET closed loop control methods. Open loop methods, where adjustments in transmission parameters for the forward link (node 1 transmitting to node 2) are made by node 1 based directly on receptions made on the reverse link (node 2 transmitting to node 1), can suffer from asymmetrical channel conditions.

Accordingly, there is a need to exploit the synergistic relationship between Open and Closed loop link measurements. More particularly, there is a need to utilize the Closed Loop more in static environments where a lower update rate may be acceptable since the channel is not as dynamic and where static asymmetric channel conditions can be compensated for via the closed loop. In dynamic channel conditions, the Open Loop may be favored since the asymmetrical channel fading can be filtered via low pass filtering and the more symmetrical link components compensated for, and where the Open Loop can provide lower latency in the link measurements with respect to the Closed Loop.

Further, there is a need to utilize pre-loaded State Transition tables that utilize the measurements made from either the Open or Closed loops as "trip points" between states. Since channel estimation can be a highly non-linear process, any algorithm used would be very segmented, by necessity, in order to approach piece-wise linear operation. The utilization of a State Transition table provides an optimal form of this piece-wise process whereas each state within the table may represent an optimal set of transmission parameters for the current link condition. Additionally, there is a need for methods in which the output from both the Open/Closed loop selection/combining process and the State Transition Transmission Parameter adjustments are used to estimate actual link quality in terms of stability, capacity, margin, or packet error rate.

It would be desirable to provide a system and/or method that provides one or more of these or other advantageous features. Other features and advantages will be made apparent from the present specification. The teachings disclosed extend to those embodiments which fall within the scope of the appended claims, regardless of whether they accomplish one or more of the aforementioned needs.

SUMMARY

An example of the invention relates to a method of selecting link metric measurements from at least one of open loop and closed loop measurements. The method comprises sending by a first node, a first radio communication and receiving by a second node the first radio communication. The method also comprises estimating by the second node the dynamics of the communications channel using at least one of the variance and mean deviation of link metric measurements. The link metric measurements are at least one of symbol error rate (SER), packet error rate (PER), frame error rate (FER), bit error rate (BER), signal to noise ratio (SNR), and received signal strength (RSS). Further, the method comprises categorizing the dynamics of the communications channel into one of at least two groups based on the estimate. Further still, the method comprises selecting based on the chosen group, the use of at least one of closed loop link adaption and open loop link adaption of communication link parameters.

Another example of the invention is linked to a method of changing communications link adaption techniques in a network of radio communication nodes. The method comprises detecting interference based on an open metric. The method also comprises estimating using an open loop estimator, the channel dynamics. Further, the method comprises determining, whether transmission parameters should be adjusted based on open looped metrics or closed loop metrics, based on the channel dynamics. Further still, the method comprises adjusting transmission parameters by using a State Transition Table based on the estimate.

Yet another example of the invention relates to a method of specifying linked quality. The method comprises sending by a first node a first radio communication and receiving by a second node the first radio communication. The method also comprises estimating by the second node the dynamics of the communication channel using at least one of the variance in mean deviation of linked metric measurements.

It would be desirable to provide a system and/or method that provides one or more of these other advantageous features. Other features and advantages will be made apparent from the parent application. The teachings disclosed extend to those embodiments which fall within the scope of the appended claims, regardless of whether they accomplish one or more of the aforementioned needs.

BRIEF DESCRIPTION OF THE DRAWINGS

The invention will become more fully understood from the following detailed description, taken in conjunction with the accompanying drawings, wherein like reference numerals refer to like elements, in which:

FIG. 7 is an exemplary depiction of a representative state transition table, wherein

DETAILED DESCRIPTION OF PREFERRED AND EXEMPLARY EMBODIMENTS

Overview of Hybrid Open/Closed Loop Filtering

Figure 1:
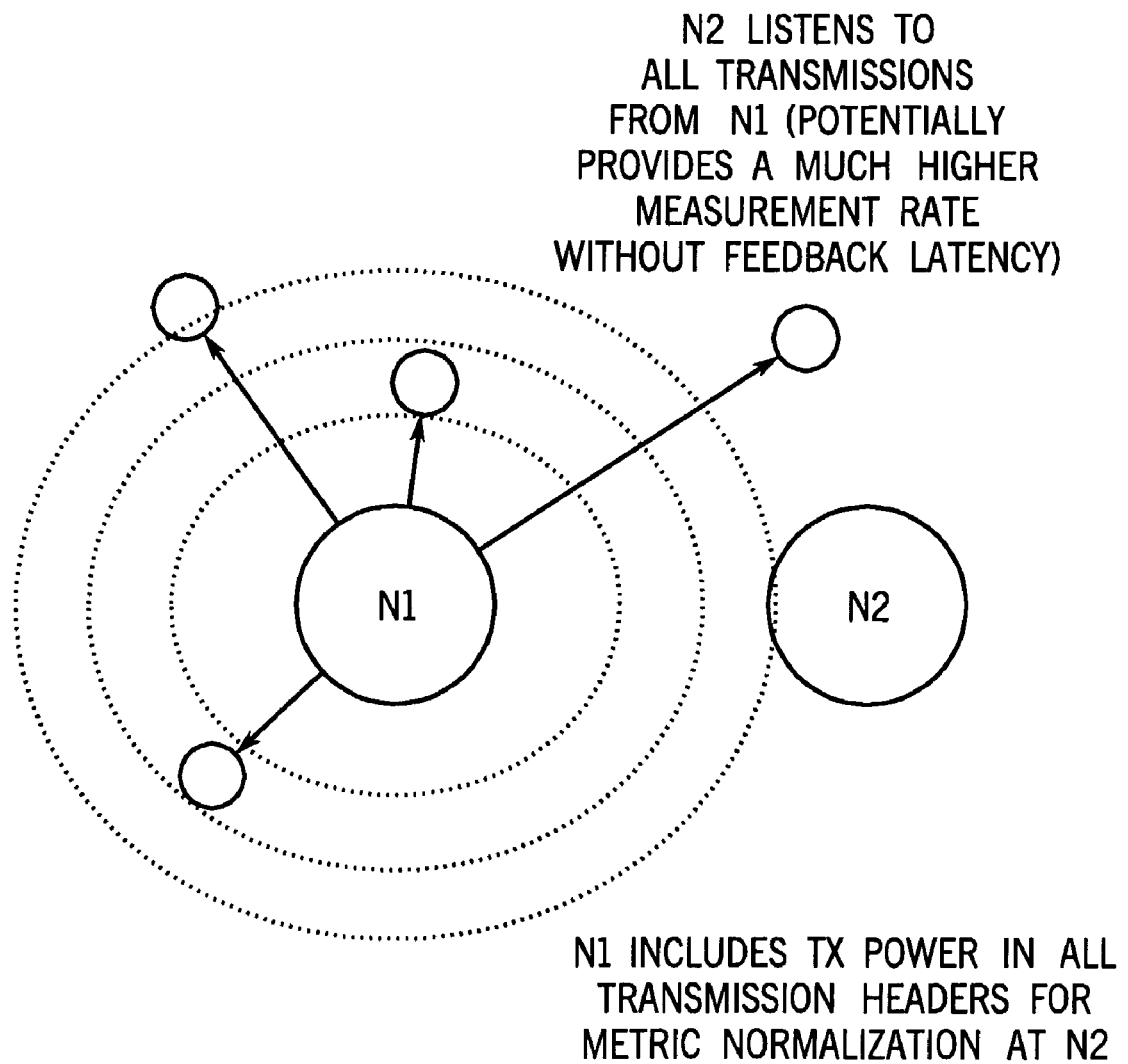
FIG. 1 is an exemplary depiction of an open loop link metric transmission system.

In accordance with an exemplary embodiment, Open Loop filtering refers to the process of one node filtering/estimating link parameters directly from receptions from another node. Referring now to FIG. 1, node N2 is operating in Open Loop mode and makes link metric (Signal Strength, Symbol Error Rate, Signal-to-Noise Ratio, etc.) measurements on every transmission received from N1. Since N2 is making measurements even when N1 is communicating with other nodes, the Open Loop can provide more frequent observations to its estimating filters with little latency. However, since N1 may be varying its transmission power and modulation type from one transmission to the next, it is necessary for N2 to "normalize" these measurements with respect to N1's transmit power and modulation type.

Figure 2:
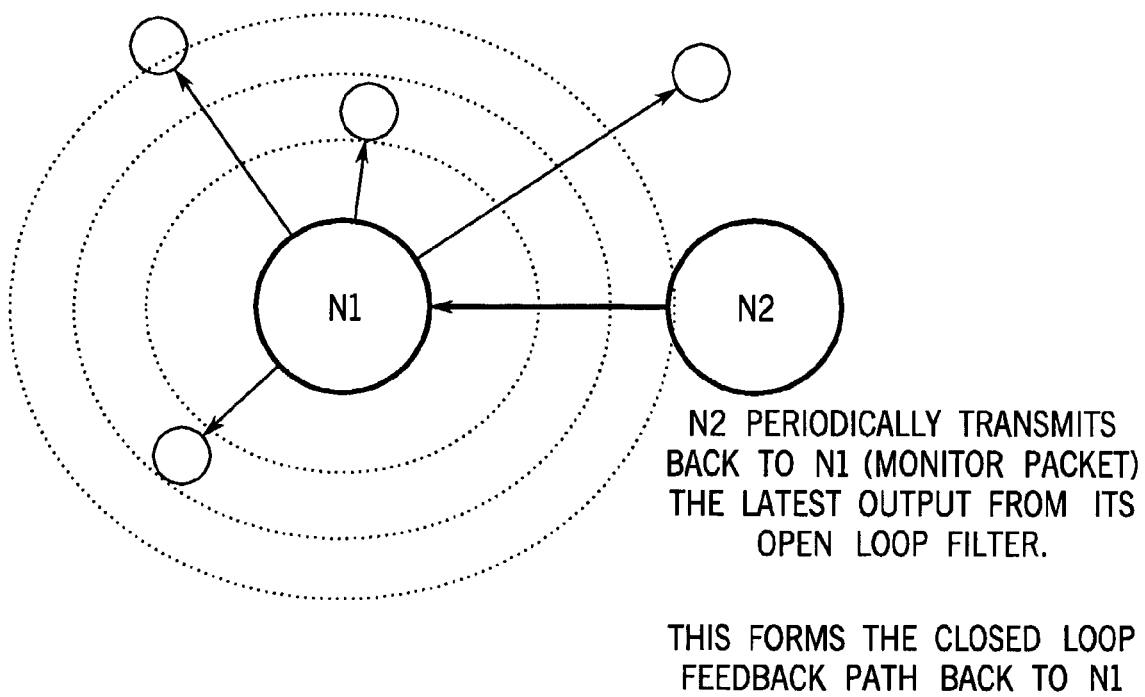
FIG. 2 is an exemplary depiction of a closed loop link metric communication system.

Referring now to FIG. 2, Closed Loop filtering refers to the process of one node (e.g. N2) periodically transmitting back to its peer node (e.g. N1, the node on the other end of the link being estimated), the latest output from its Open Loop filter. This forms the Closed Loop feedback path which often occurs much less frequently than measurement opportunities available to the Open Loop for the reasons stated above.

Both the Open and Closed loops have advantages and disadvantages, but these are usually synergistic to each other. The advantage that the Open Loop has over the Closed Loop is the potential for more frequent filter updates and lower latency. The disadvantage of the Open Loop is that the channel is not always symmetrical for bi-directional transmission between the two nodes. Since Open Loop measurements are made in only the receiving direction, the assumption of symmetry has to be made when adjusting transmission parameters in the opposite direction. The propagation channel is often considered (Suzuki process) to have two basic components, a short-term fading component that is often represented well in urban environments by a Rayleigh distribution, and a long-term fading component due to shadowing that is represented by a lognormal process (Ricean/lognormal for extended Suzuki). The long-term fading is generally assumed to be symmetrical in either direction between two communicating nodes; however, the short-term fading phenomena can be significantly asymmetrical when the properties and placement of physical objects that scatter and absorb the RF energy are considered. In addition, the receiving hardware may differ between the two nodes which can also cause measurement asymmetry.

Although the Open Loop may fall short in estimating asymmetrical channel metrics, the potentially much greater observation rate as compared to the Closed Loop makes it the preferred estimation filter when the node or channel is very dynamic. This is because motion allows the filter to remove much of the potentially asymmetrical fast-fading effects and estimate the long-term, more symmetric effects such as free space loss and shadowing.

The Closed Loop on the other hand may be preferred when the node is less dynamic or static. Since the loop latency (interval between monitor packets) becomes less of a factor in this case, and since the Closed Loop does communicate asymmetrical effects back to the transmitting node, it may be favored when the node and/or channel dynamics are small.

Figure 3:
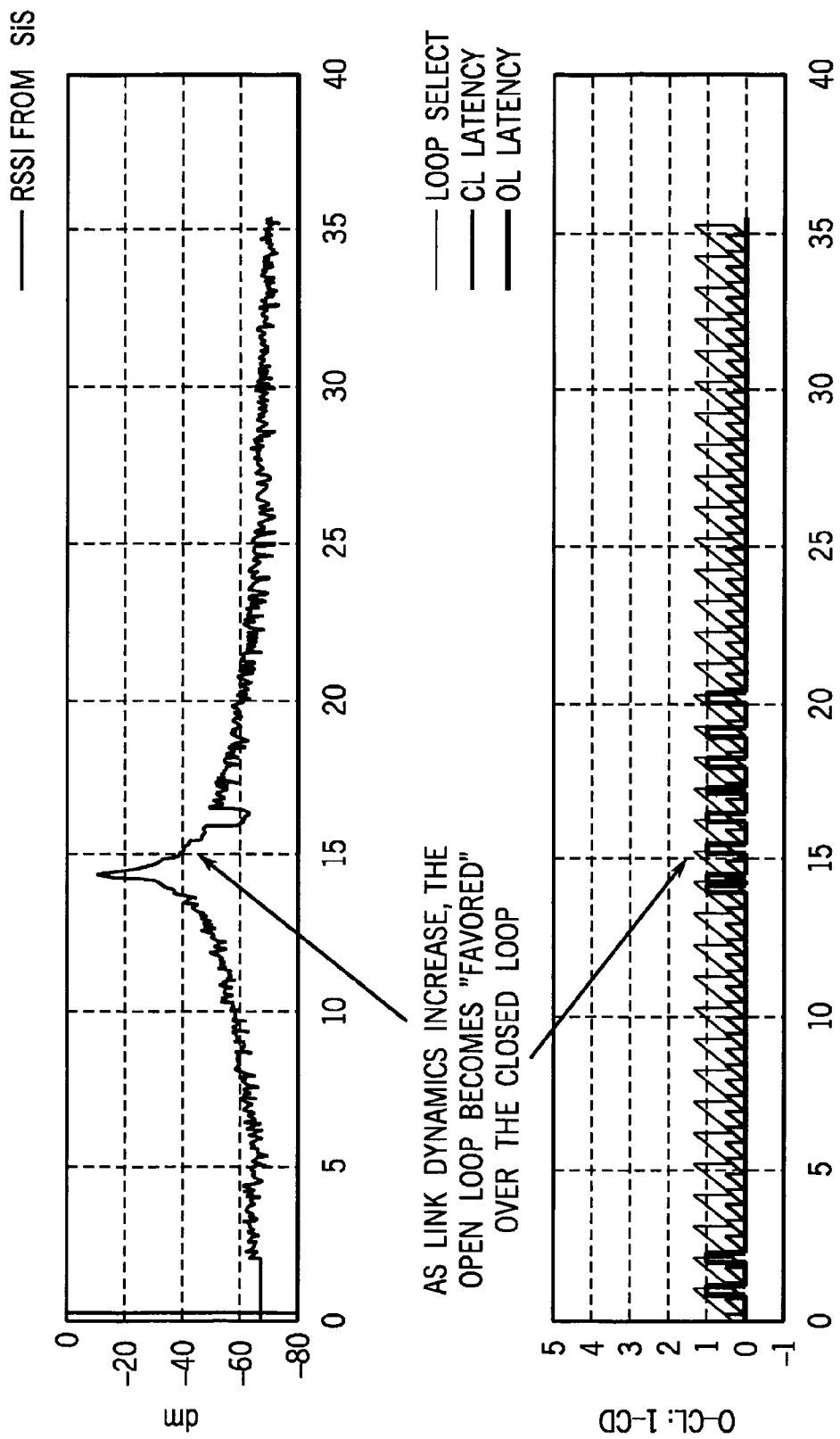
FIG. 3 is an exemplary diagram of representative graphs depicting the selection of open or closed loop link metrics.

The Hybrid function of the Link Adaption process manages and selects measurements from the two loops. Referring to the top graph of FIG. 3, the RSSI as reported from the Receiving hardware shows a very dynamic channel. In the bottom graph it can be seen that the Hybrid function is selecting the Open Loop earlier and for a longer period of time as the dynamics increase. The CL latency curve of the bottom graph shows the time between Closed Loop monitor packet receptions and the OL latency curve shows the time between Open Loop measurements. As the dynamics increase, the tolerance for Closed Loop latency decreases and the Open Loop is selected.

The Closed Loop, however, should always be selected when it indicates that a more robust state is needed. This is because only the Closed Loop can indicate to the peer node that a jammer is nearby.

Overview of Generic Table-Driven State Transitioning of Transmission Parameters

Figure 4A:
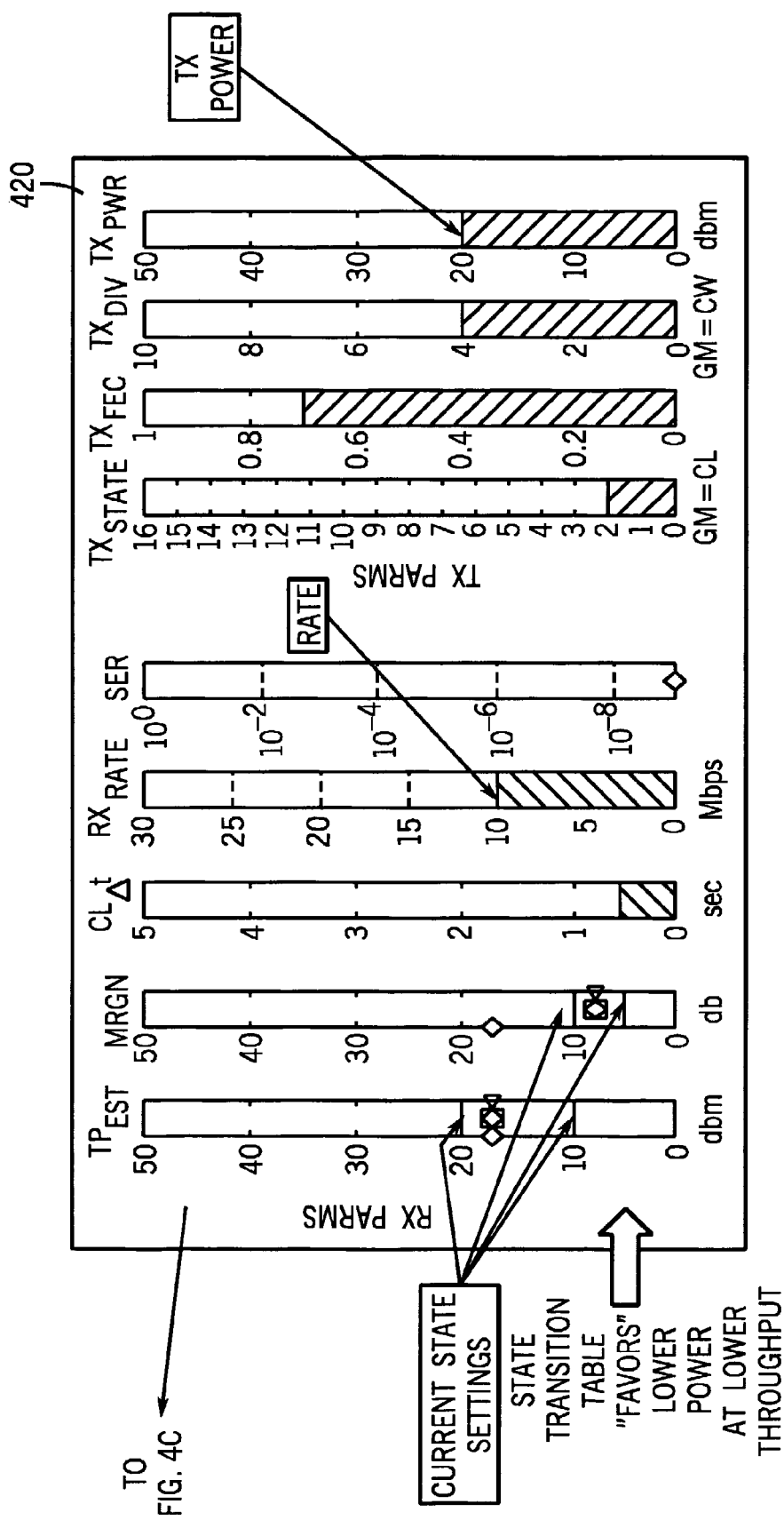
FIG. 4 is an exemplary depiction of the system performance related to the use of two different state transition tables both having different performance goals.
Figure 4B:
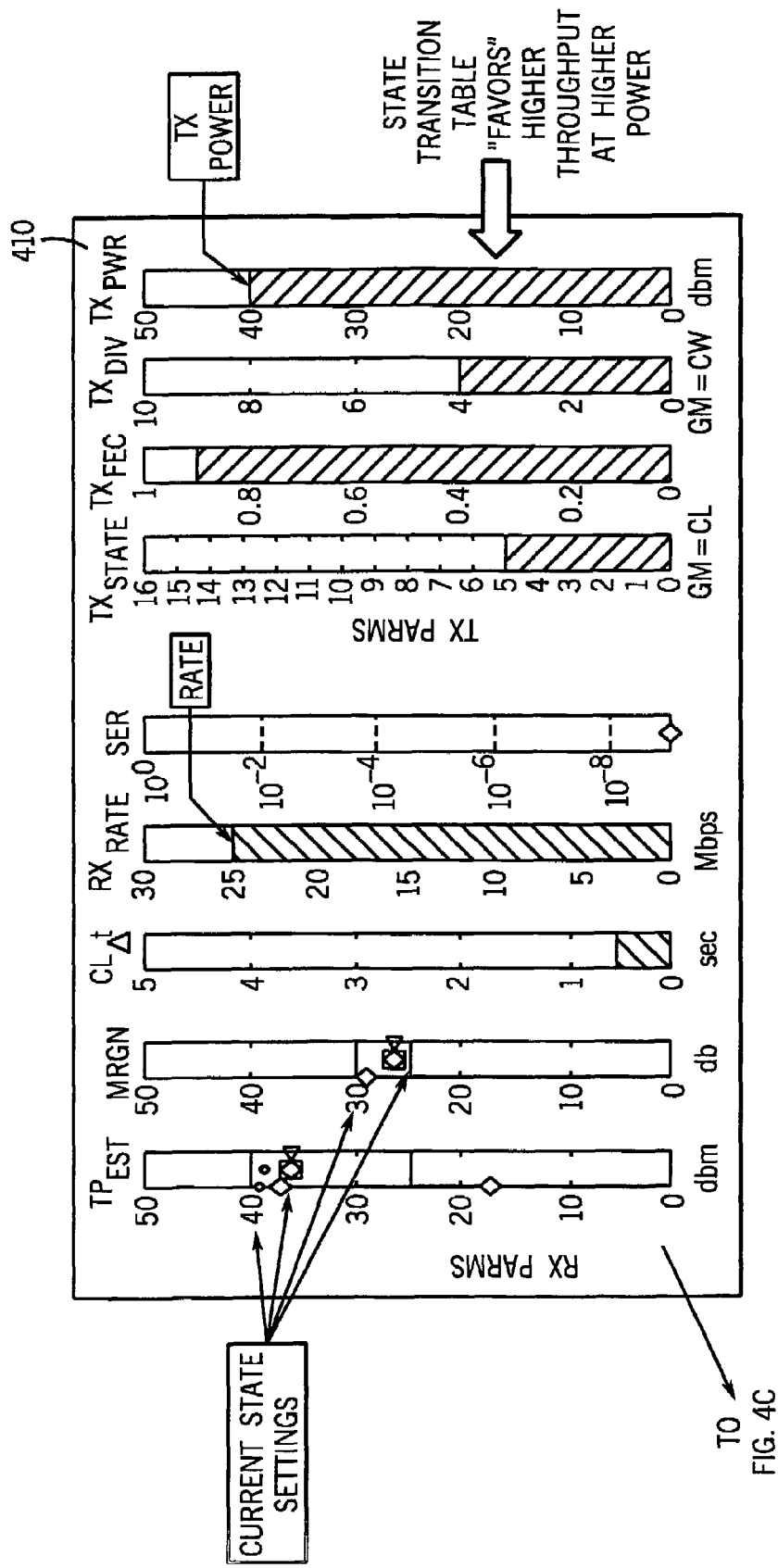
Figure 4C:
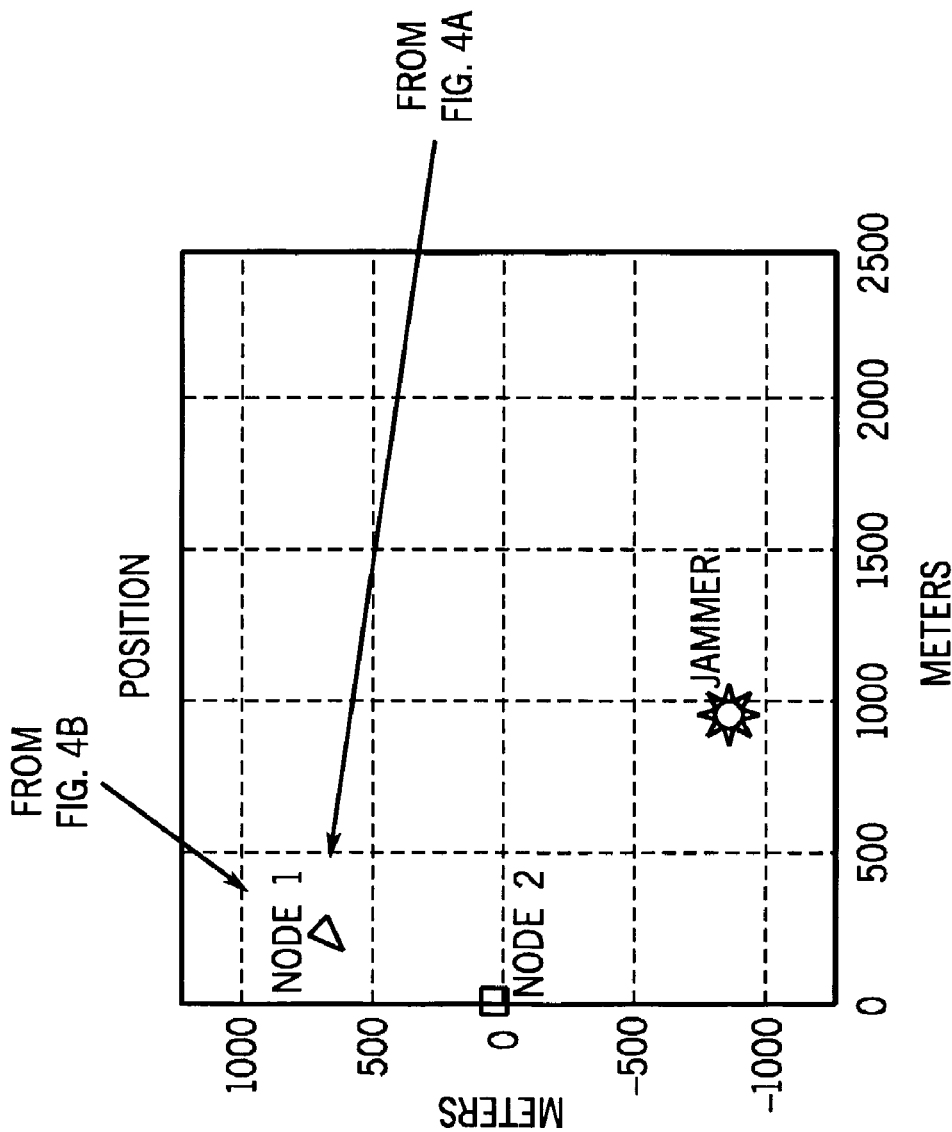

According to an exemplary embodiment, Tables may be used to define Link Adaption "States" and to define the behavior of the Link Adaption algorithms. This method has several advantages. The advantages include, but are not limited to:
Independence from Hardware
Configurable and loaded at initialization
State Transition Table can "drive" Link Adaption towards different goals. These goals may include:
highest throughput
lowest power
most robust against multipath
most robust against jamming Referring now to FIG. 4, the utilization of two different State Transition Tables is depicted. It can be seen that as Node 1 approaches Node 2 the State Transition Table associated with 410 activates high-rate modulation (in this case 16-DPSK) and increases the power to 40 dbm to maintain link margin. The State Transition Table 420 shows power being reduced to 20 dbm with a less efficient modulation being used (4-DPSK) and a corresponding decrease in throughput.

Figure 5:
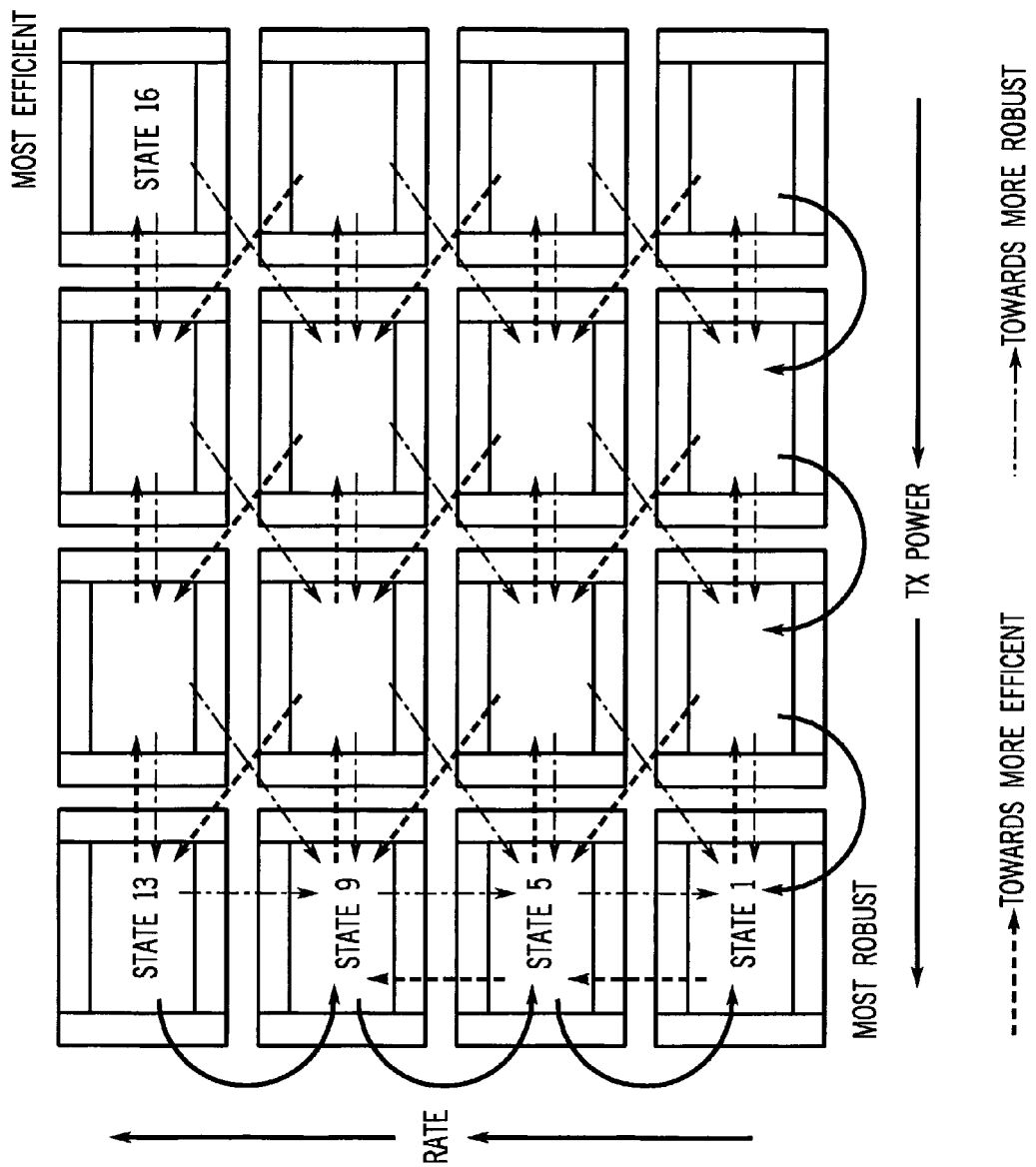
FIG. 5 is an exemplary depiction of a state transition table using two link metrics, each state being similar to the state depicted in FIG. 6.

The general format of the State Transition table is depicted in FIG. 5. The dashed arrows represent transitions towards more efficient (in throughput or power) states and the solid arrows represent transitions to more robust states (more tolerant to errors).

In accordance with an exemplary embodiment, each state depicted in the table specifies, e.g. (see FIG. 6):
State Number
Transmit Power
Diversity Level
Diversity Type (ex. Codeword or Repetition)
FEC Rate
Modulation Type
Frequency Spreading Rate (OFDM)

Figure 6:
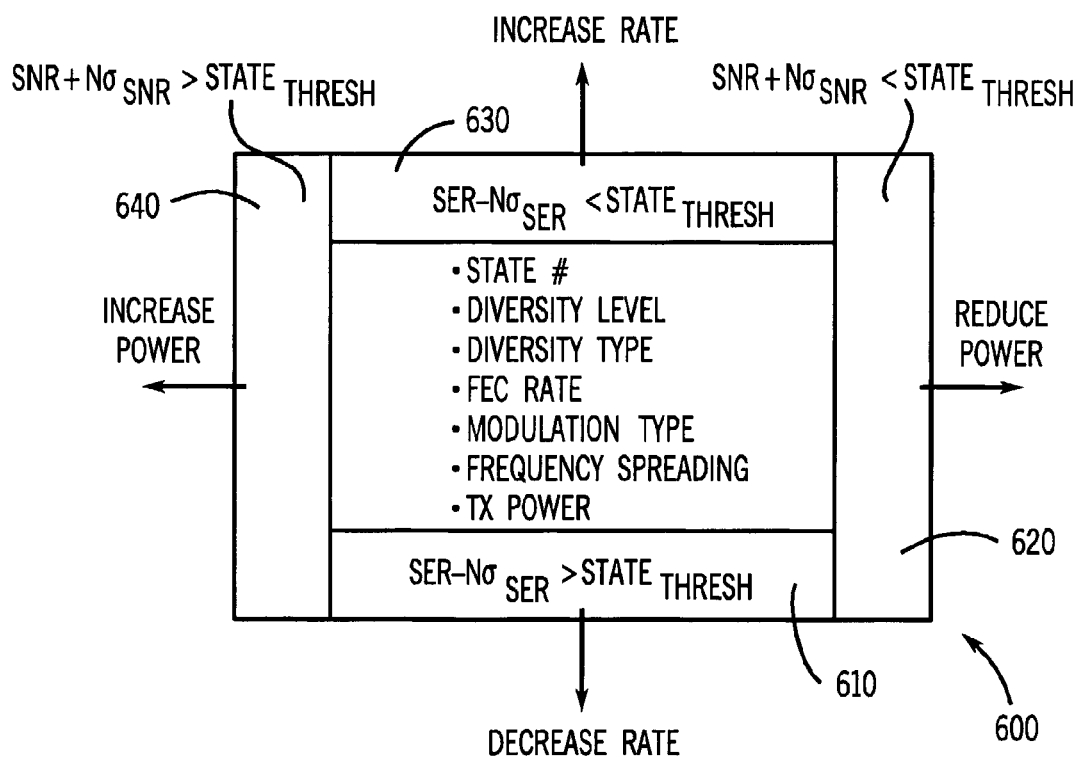
FIG. 6 is an exemplary depiction of a representation of an individual link adaption state, a plurality of which are depicted in FIG. 5.

In addition according to an exemplary embodiment, each state may have 4 thresholds 610, 620, 630 and 640, as depicted in FIG. 6.

In accordance with an exemplary implementation (see FIG. 7), the State Transition table 700 also contains information that instructs the State Transition algorithms how to perform its analysis and instructs a Normalization function on how to perform combining of the multiple diversity measurements received from the receiving hardware. FIG. 7 depicts an actual embodiments of State Transition Table 700 that seeks to maximize throughput and only reduces power when no further increase in throughput can be obtained.

State Stability Indicator

In accordance with an exemplary embodiment, another function of the State Transition process is to compute the State Stability Indicator. This indicator may be a single number in the range 0-100 which serves as a figure-of-merit with 100 being the most stable (the furthest away from the next state change). The number may be a function of:

The distance between each metric and the nearest state transition "trip point"
    The metric variance
    The time in state The stability number should be well behaved but should not require compromise in the actual metrics in order to be so.

The Stability Indicator may change from stable to less stable when the link is about to change to a less efficient (more robust) state, indicating a degradation in the link. However, the Stability Indicator should continue to indicate stability when the pending state change is to a more efficient state (indicating an improving link).

Link Adaption Functions

Figure 8:
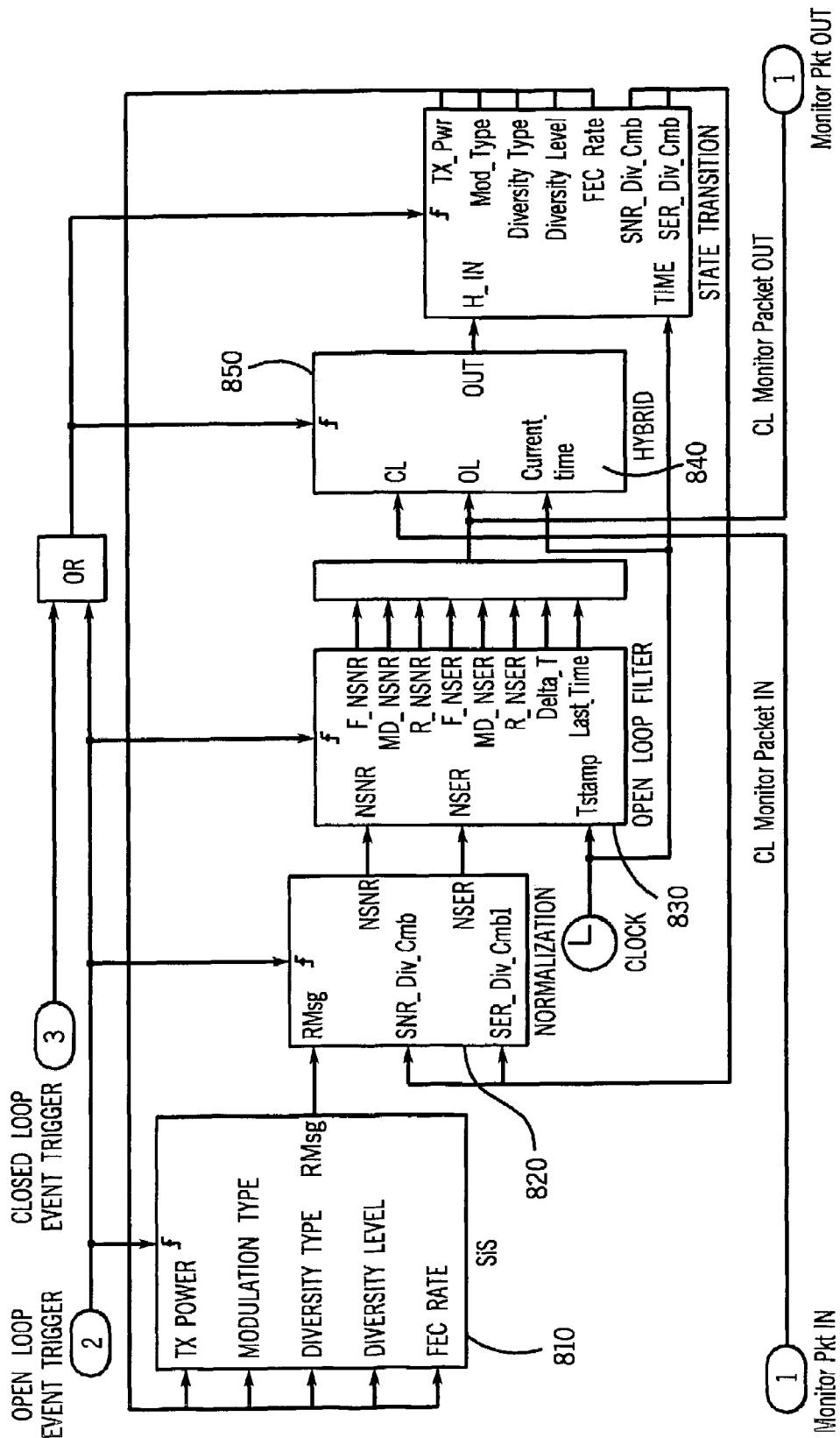
FIG. 8 is an exemplary depiction of a link adaption functional block diagram.

According to an exemplary embodiment, the MDL Link Adaption process contains or interacts with five functional units as illustrated in FIG. 8, Receiving hardware 810, Normalization 820, Open Loop Filtering 830, Hybrid Loop Management 840, and state Transitivity 850. The block diagrams provided are a representative embodiment of the hybrid system including one or more features of the invention. The representative embodiment is intended as a specific example but is not provided to be limiting.

Receiving Hardware Functional Interaction

The Signal in Space (SiS) 810 models the receiving hardware. In an exemplary embodiment the communication channel is modeled as independent combinations of Rayleigh and Ricean fading.

In this exemplary embodiment, Symbol Error Rate (SER) and Signal-to-Noise Ratio (SNR) for the communications channel is output as a function of received signal strength using ideal SER vs. SNR curves but may be replaced with alternative data or models. The Receiving hardware model currently calculates a Signal-to-noise-plus-interference-ratio (SNIR) from the incoming channel using the received signal strength relative to a configurable noise bandwidth, noise figure, and front-end loss. The Received Signal Strength Indicator (RSSI) may optionally be used as a metric.

The purpose of the Normalization 820 function is to remove discontinuities in the SNRs and SERs received in the Receive Message caused by a transmitting node using different power levels and different modulations from one message to the next. It may be necessary to remove these power "steps" in the measurements these effects which would otherwise appear as discontinuities to the Open Loop smoothing filter and would overwhelm the metrics actually being estimated.

Since a transmitting node can be communicating on several links, it is anticipated that it can be transmitting at many different power levels and using different modulations (for example 4-DPSK and 16-DPSK). It may therefore be necessary to normalize or remove these effects which would otherwise appear as discontinuities to the Open Loop filter and would overwhelm the metrics actually being estimated.

The Normalization function may be configured to execute on every Receive Message (Open Loop event trigger).

Inputs

RMsg: Receive Message from the Receiving hardware plus the Transmitted Power from the transmission header. This message may contain the following parameters according to an exemplary embodiment:
(1) Transmitted Power: Power the message was transmitted at in dbm.
(2) RSSI: Received Signal Strength Indicator. In one embodiment these powers will be presented as the number of 2 db steps below the maximum hardware transmit power level in dbm.
(3) SNR: Signal to Noise plus Interference Ratio In one embodiment this number will be in 1 db increments from −10 to 50 db.
(4) SER: Symbol Error Rate. In one embodiment this number will be in a scaled fixed point representation.
(5) Mod_Type: The modulation type that was used (for Orthogonal Frequency Division Multiplexing [OFDM] this may be 4-DPSK or 16-DPSK).
(6) Div_Lvl: The diversity level used (which may be different than the Receiving hardware maximum diversity or the session diversity). This range will be from 1-5.
(7) Div_Type: The type of diversity being used. Currently this will be Codeword, Repetition, or none.

SNR_Div_Cmb: The method to be used for combining the SNRs from the Receiving hardware physical channels (up to 5). 0=Min Pick, 1=Max Pick, 2=Average. This value is set by the State Transition function.

SER_Div_Cmb: The method to be used for combining the SERs from the Receiving hardware physical channels (up to 5). 0=Min Pick, 1=Max Pick, 2=Average. This value is set by the State Transition function.

Outputs

NSNR: The Normalized Signal to Noise Ratio output to the Open Loop filter. This value should have any discontinuities removed that were introduced by the transmitting node using different power levels in the received messages.

NSER: The Normalized Symbol Error Rate output to the Open Loop filter. This value should have any discontinuities removed that were introduced by the transmitting node using different power levels and different modulation types in the received messages.

Execution Frequency

The Normalization function may execute on every Open Loop event.

Initialization Parameters

SER Normalization

The Normalization function requires that an SER/SNR conversion table be loaded which is specific to the receiving hardware being instantiated. This table contains an SER vs. SNR curve for each modulation type used by the hardware. This table may have less than 30 points per curve and the values may be in scaled fixed point format compatible with values received from the receiving hardware. In order to normalize the Max, Min, or Average SER value (see Algorithms below) the SER value is matched to the nearest entry in the table pertaining to the type of modulation used (4 or 16-dpsk for OFDM in the example above). A corresponding SNR is then read from the table. It is important to note that after the Transmitted Power is subtracted from this value it may still be referred to as NSER, which is different than NSNR that is calculated directly from SNR.

Algorithms

Figure 9:
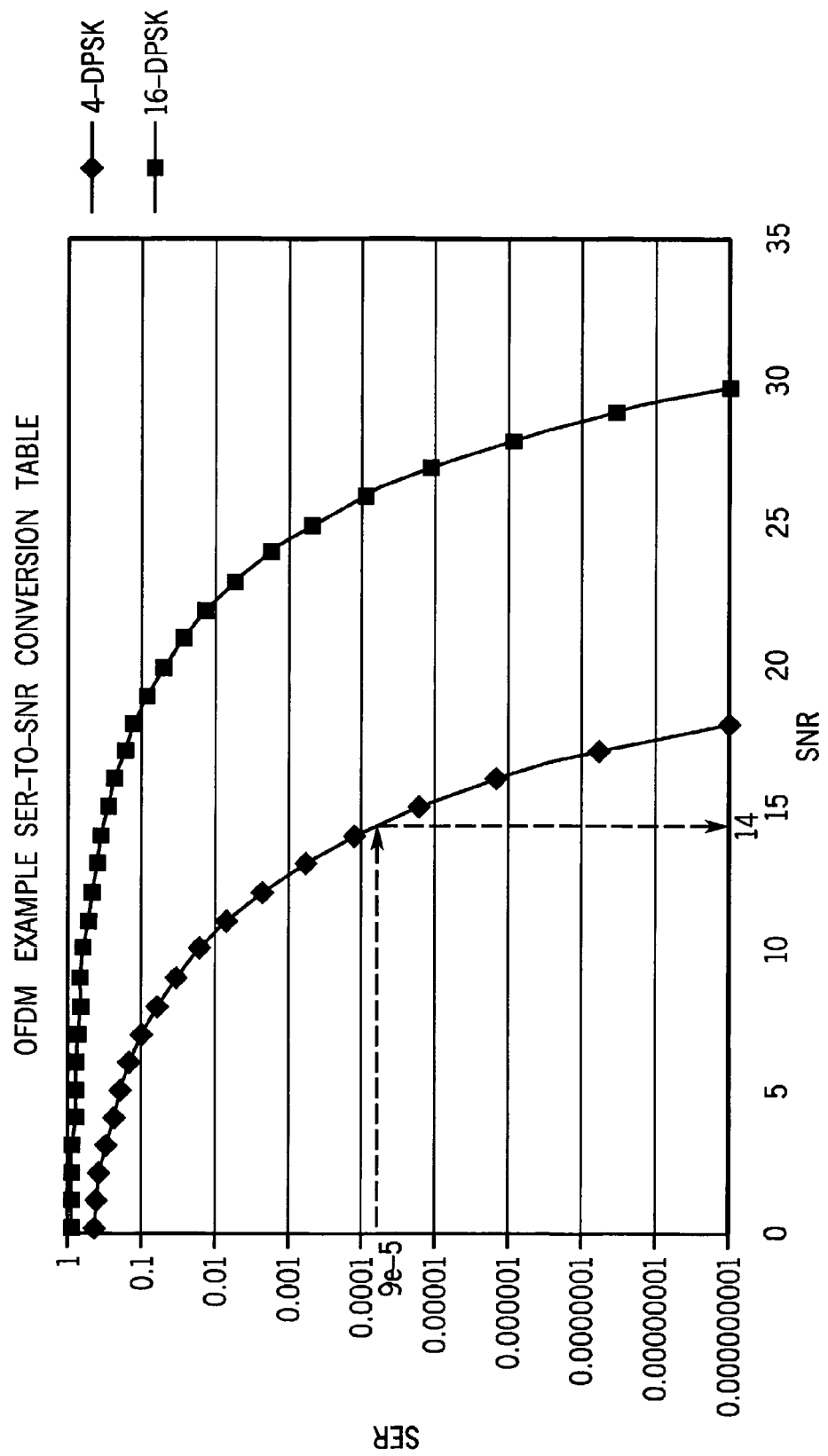
FIG. 9 is an exemplary depiction of the symbol error rate to signal to noise ratio conversion as part of an intra-modulation normalization process.

In an exemplary embodiment, the Normalization function performs the following (see FIG. 9):

1. Computes a Max Pick, Min Pick, or Average calculation as indicated on the SNR values (up to 5) received in the Receive Message from the receiving hardware. Max Pick, Min Pick, or Average calculation is determined by the value of SNR_Div_Cmb as set by the State Transition Function (0=Max, 1=Min, Avg).
2. Subtracts the Transmitted Power, as indicated in the received Transmission Header, from the Min, Max, or Average SNR.
3. Computes a Max Pick, Min Pick, or Average calculation on the SER values (up to 5) received in the Receive Message from the receiving hardware. Max Pick, Min Pick, or Average calculation is determined by the value of SER_Div_Cmb as set by the State Transition Function (0=Max, 1=Min, 2=Avg).
4. Computes an SER-to-SNR conversion on the Max, Min, or Average SER value using the receiving hardware SER/SNR conversion table loaded at initialization time and the Modulation Type as specified in the Receive Message.

Pseudo Code

The following is a pseudo code representation of the computations listed above and has been provided as exemplary, but should not be deemed as limiting.

```
% SNR Diversity Combining 0=Max 1=Min 2=Avg
if NSNR_Div_Cmb == 0, NSNRcmb = max(NSNR(1:Div_Lvl)); end
if NSNR_Div_Cmb == 1, NSNRcmb = min(NSNR(1:Div_Lvl)); end
if NSNR_Div_Cmb == 2, NSNRcmb = mean(NSNR(1:Div_Lvl)); end
NSNR_OUT = NSNRcmb - TX_Pwr;
% SER Diversity Combining 0=Max 1=Min 2=Avg
if NSER_Div_Cmb == 0, SERcmb = max(SER(1:Div_Lvl)); end
if NSER_Div_Cmb == 1, SERcmb = min(SER(1:Div_Lvl)); end
if NSER_Div_Cmb == 2, SERcmb = mean(SER(1:Div_Lvl)); end
%Find in the SER Normalization Table the corresponding SER for the
Mod Type
% and the related SNR. Find entry that is bounded by the SERcmb ± tol
Tolerance = 1e-9;
[Indx] = find((SERcmb -Tolerance) < SERTable(Mod_Type+1,:) &
SERTable(Mod_Type+1,:) < (SERcmb+Tolerance));
if Indx,   % If a bounded entry did exist in the Table
    NSER = SERTable(1,Indx));
Else % otherwise choose one end of the table or the other
    NSER = 0;
    if SERcmb < SERTable(Mod_Type+1,SERTlength),
        NSER= SERTable(1,SERTlength);   %Row one is
    SNRs
    elseif SERcmb > SERTable(Mod_Type+1,1),
        NSER = SERTable(1,1);     %Row one is SNRs
    end
end;
% Subtract the Transmitted Power as the last step in the SER
normalization
NSER_OUT = NSER - TX_Pwr;   %Normalized Margin Estimate
```

In accordance with an exemplary embodiment, the Open Loop filtering function smoothes and estimates the mean, mean deviation, and rate (future) of the normalized link metrics. Its outputs are fed directly to the Hybrid function on the host node and are sent as Closed Loop inputs to the Hybrid function of the Peer node(s).

Figure 10:
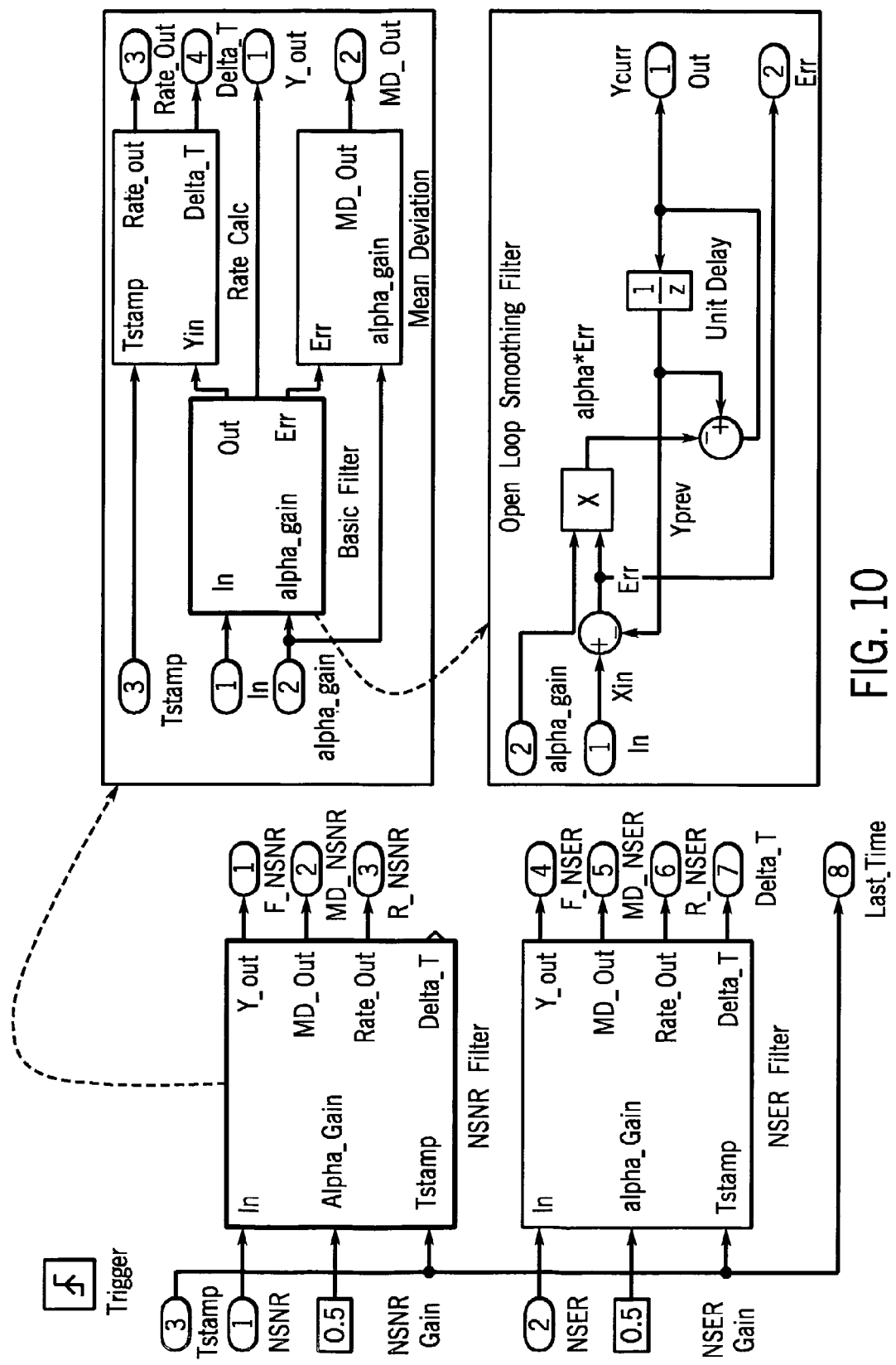
FIG. 10 is an exemplary depiction of an open loop smoothing filter sub component.

The Open Loop filter may consist of a first-order smoothing filter, a mean deviation calculator, and a rate-of-change calculator for both the normalized SNR and SER inputs from the Normalization function. FIG. 10 depicts the functional breakdown of the Open Loop filter function into its subcomponents and highlights the first-order smoothing filter.

An exemplary algorithmic form of the first-order smoothing filter is:

$$Yout = Yprev + Gain*(Xin - Yprev)$$

Where:
Yout=the current filter output (smoothed value)
Yprev=the previous filter output (from the last Open Loop event)
Gain=the configurable filter binary shift gain (0.5, 0.25, 0.125)
Xin=the current input from the Normalization function (NSNR or NSER)

The gains may be chosen as shifts of two and the filter may be implemented in fixed-point arithmetic.

In addition to the smoothing filter, each Open Loop subcomponent may include a mean deviation calculation of the form:

$$MDout = MDprev + Gain*(|Xin - Yprev| - MDprev)$$

Where:
MDout=the current estimate of the Mean Deviation
MDprev=the previous Mean Deviation estimate (from the last Open Loop event)
Gain=the configurable filter binary shift gain (0.5, 0.25, 0.125) used in the smoothing filter (but separately configurable for NSNR, and NSER)
Xin=the current input from the Normalization function (NSNR or NSER)

Since the normalized SNR (NSNR) and normalized SER (NSER), as well as normalized RSSS may have substantial biases (inaccuracies that remain relatively constant over a period of time) it may be desirable to use the Rate-of-Change (hereafter rate) for some estimates in the future since the rate of change removes the effects of constant Biases. For example, to detect the presence of jamming we may compare the rate of the SNR in one direction and the rate of the RSSI in the other direction. In addition, should state transition forward propagation and/or prediction become necessary, the rate calculation could also be used in first-order extrapolations of the underlying metrics.

Although rate is optionally used, its calculation is included here for reference.

$$Rout = (Yout - Yprev)/(Current\_Time - Last\_Event\_Time)$$

Where:
Yout=the current filter output (smoothed value)
Yprev=the previous filter output (from the last Open Loop event)
Current_Time=the current network time
Last_Event_Time=the time of the last measurement (the last time the Open Loop filter was run).

Figure 11:
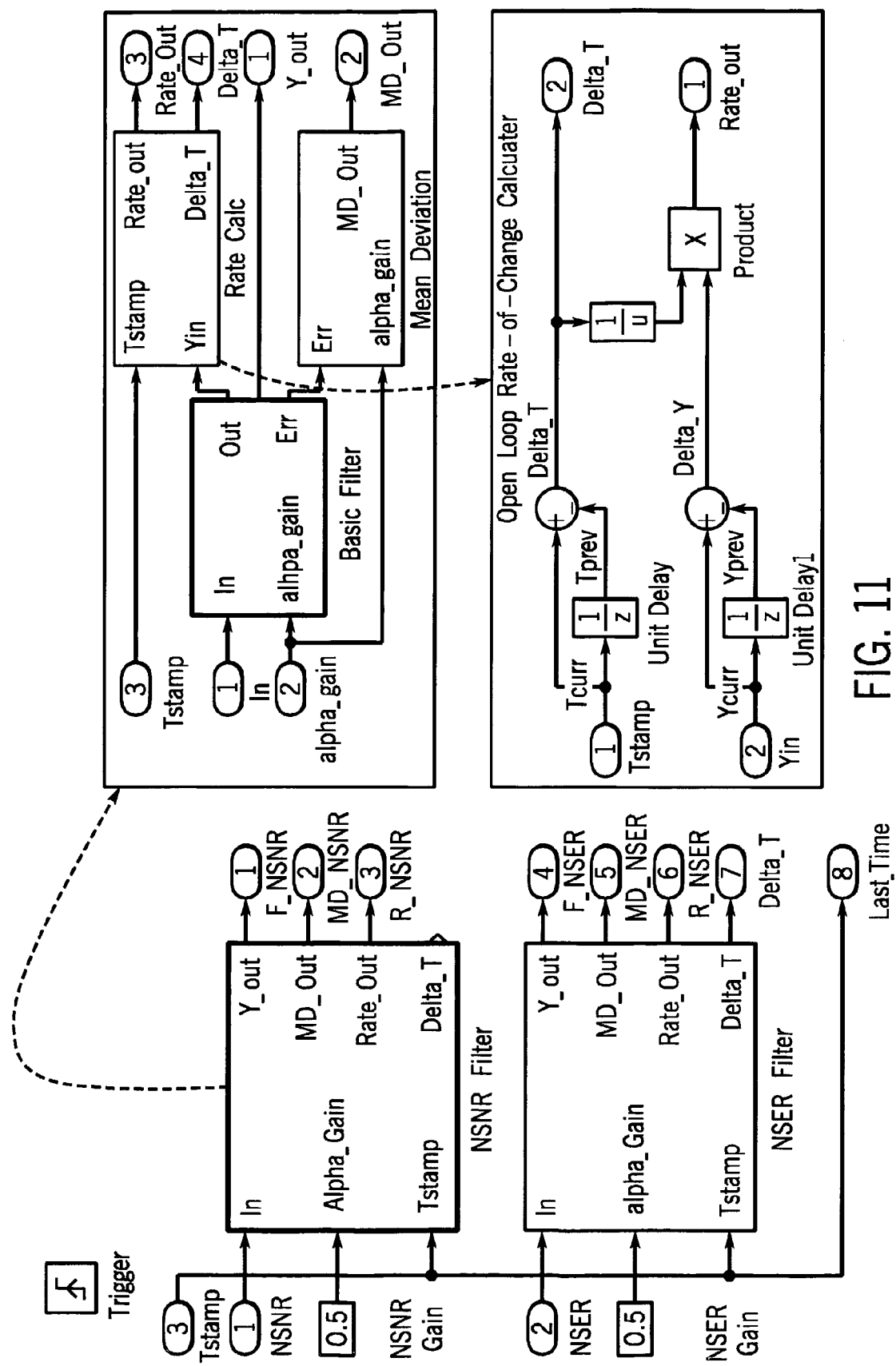
FIG. 11 is an exemplary depiction of an open loop rate of change calculator subcomponent.

FIG. 11 depicts a break-out of the rate calculator and how it interacts with the Open Loop smoothing filter.

Although the rate calculator may be optionally used it still may be necessary for the Open Loop function to maintain a Last_Time stamp which is included in the Closed Loop monitor packets and used by the Hybrid function to determine Closed Loop validity with respect to loop dynamics (see Hybrid Function).

Inputs

Exemplary inputs to the open loop filtering component may be:
NSNR: The normalized Signal-to-Noise Ratio from the Normalization function.

NSER: The normalized Symbol Error Rate from the Normalization function.
Current_Time: Current network time.

Outputs
F_NSNR: Filtered (smoothed) Normalized Signal-to-Noise Ratio (NSNR)
MD_NSNR: Mean Deviation Estimate of NSNR
R_NSNR: Rate-of-change of NSNR (currently not used)
F_NSER: Filtered (smoothed) Normalized Symbol Error Rate (NSER)
MD_NSER: Mean Deviation Estimate of NSER
R_NSER: Rate-of-change of NSER (currently not used)

Execution Frequency
The Open Loop Filter may be run on each Open Loop event (received message from the receiving hardware).

Initialization Parameters
NSNR_Gain: The Gain for the NSNR smoothing filter and mean deviation calculation. Typically this is a shift of two values such as (0.5, 0.25, 0.125) and should be included in the configurable items. In an exemplary embodiment that the same gain can be used for both smoothing and mean deviation calculation but for future flexibility it may be desirable to break this out into two separate gains.
NSER_Gain: Same as above but for NSER.

Algorithms
Exemplary algorithms for the open loop filtering component may include:

First Order Smoothing $$Yout = Yprev + Gain * (Xin - Yprev)$$

Where:
Yout=the current filter output (smoothed value)
Yprev=the previous filter output (from the last Open Loop event)
Gain=the configurable filter binary shift gain (0.5, 0.25, 0.125)
Xin=the current input from the Normalization function (NSNR or NSER)
Mean Deviation $$MDout = MDprev + Gain * (|Xin - Yprev| - MDprev)$$

Where:
MDout=the current estimate of the Mean Deviation
MDprev=the previous Mean Deviation estimate (from the last Open Loop event)
Gain=the configurable filter binary shift gain (0.5, 0.25, 0.125) used in the smoothing filter (but separately configurable for NSNR, and NSER)
Xin=the current input from the Normalization function (NSNR or NSER)
Rate-of-Change (optional)

$$Rout = (Yout - Yprev)/(Current\_Time - Last\_Event\_Time)$$

Where:
Yout=the current filter output (smoothed value)
Yprev=the previous filter output (from the last Open Loop event)
Current_Time=the current network time
Last_Event_Time=the time of the last measurement (the last time the Open Loop filter was run).

Pseudo Code
The pseudo code provided below is exemplary and is not intended to restrict the scope of the claims.

```
% Compute Open Loop Metrics for NSNR
F_NSNR = F_NSNR_prev + NSNR_Gain * (NSNR_IN -
    F_NSNR_prev);
MD_NSNR = MD_NSNR_prev + NSNR_Gain * (abs(NSNR_IN -
    F_NSNR) -
    MD_NSNR_prev);
F_NSNR_prev = F_NSNR;
MD_NSNR_prev = MD_NSNR;
% Compute Open Loop Metrics for NSER
F_NSER = F_NSER_prev + NSER_Gain * (NSER_IN -
    F_NSER_prev);
MD_NSER = MD_NSER_prev + NSER_Gain * (abs(NSER_IN -
    F_NSER) -
    MD_NSER_prev);
F_NSER_prev = F_NSER;
MD_NSER_prev = MD_NSER;
```

Figure 12A:
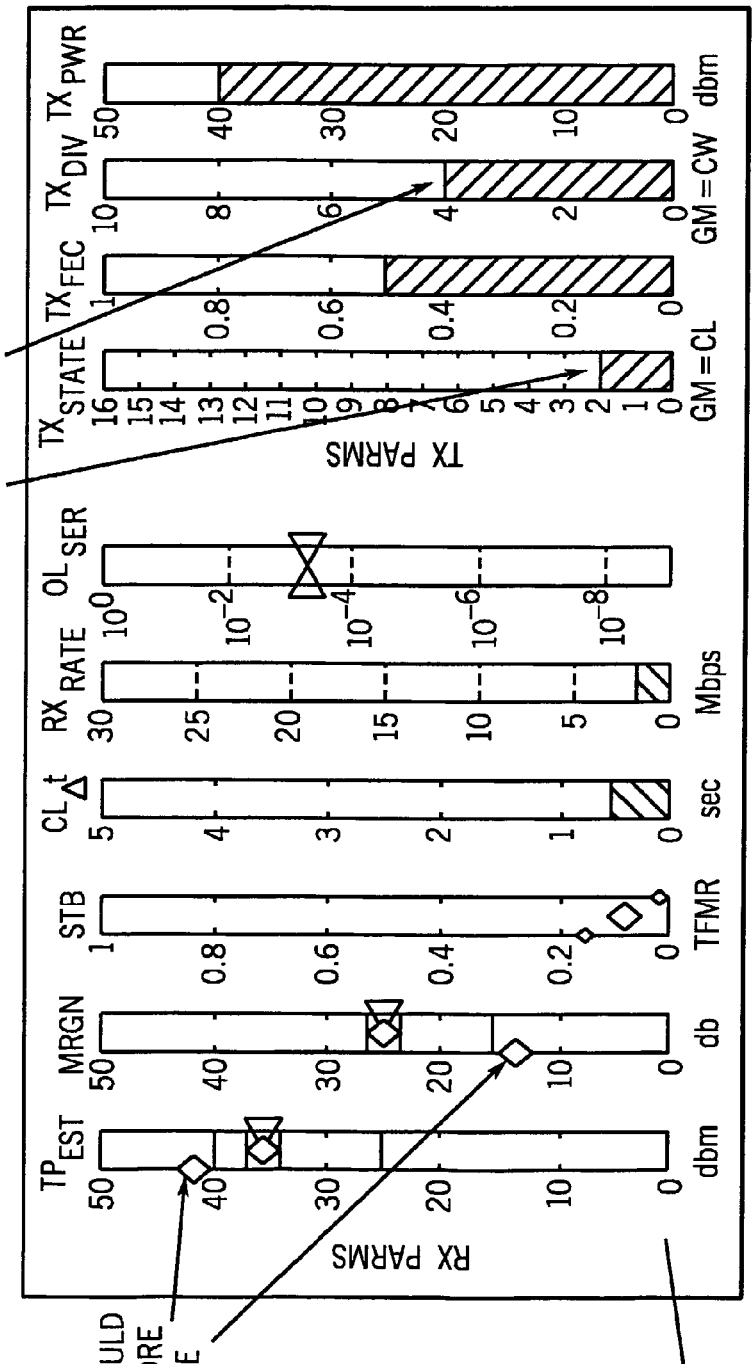
FIG. 12 is an exemplary depiction of an open/closed loop synergistic behavior.
Figure 12B:
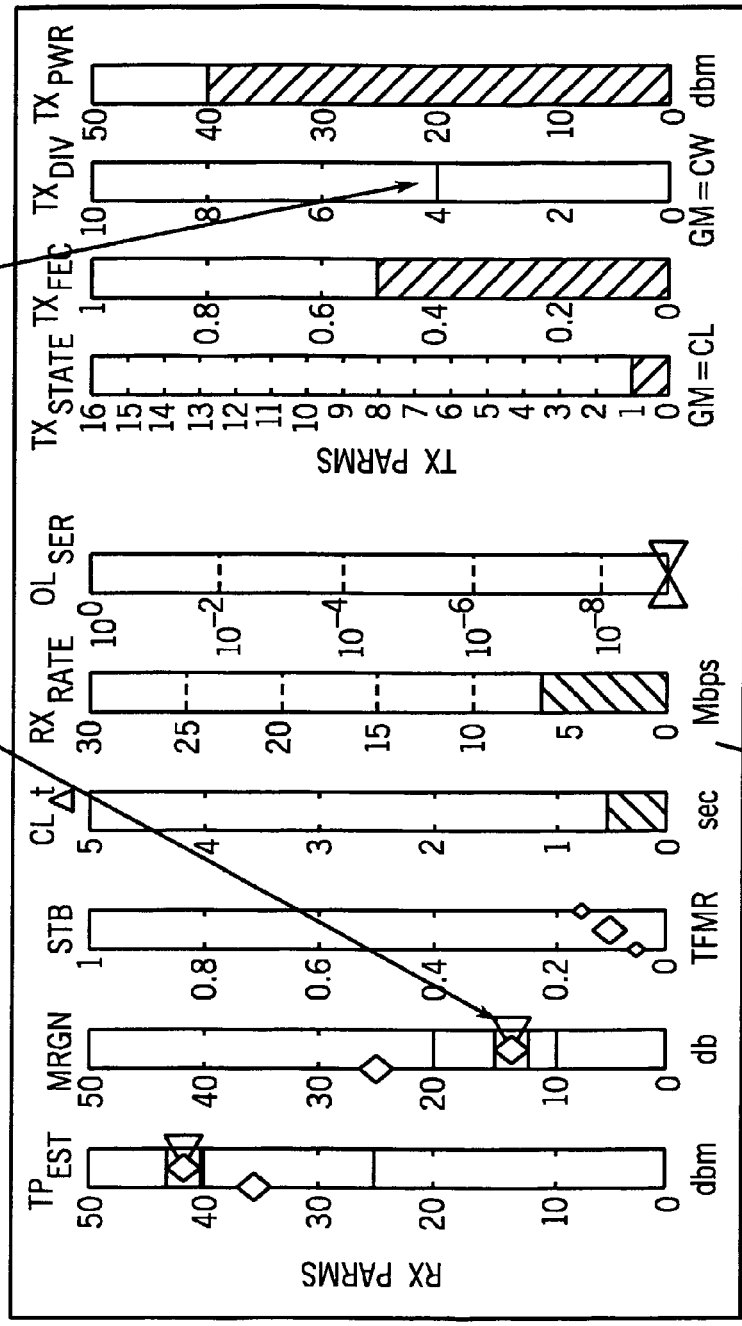
Figure 12C:
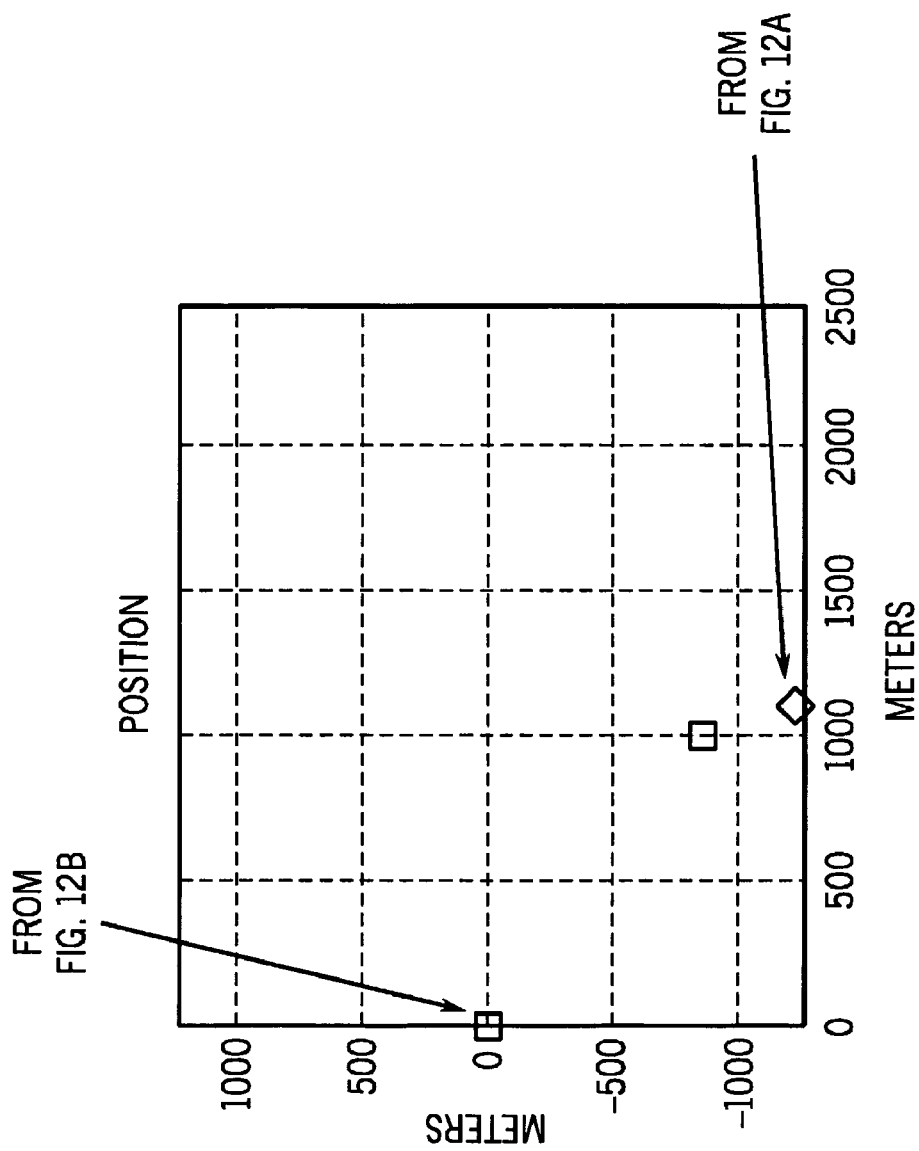

Hybrid Loop Management
The Hybrid Loop Management 840 function takes inputs from the Open Loop 830 (direct feed from Open Loop filter) and from the Closed Loop (as fed back from the peer node). The Closed Loop feedback is actually the last Open Loop output of the peer node prior to the monitor packet being sent.
Since the Closed Loop can have relative long intervals in between updates which are detrimental in a highly dynamic environment and the Open Loop can not effectively remove asymmetrical channels conditions in a static environment, the Hybrid attempts to optimize the synergistic outputs of these two loops to best match the current channel conditions.
Referring now to FIG. 12, an example of this synergistic behavior is depicted. In this example, node 2 is being jammed, and Node 1's Open Loop would indicate that a more robust setting is required to transmit back to Node 2. However, the Closed Loop reveals that Node 1 can actually communicate to Node 2 at a more efficient (higher throughput) setting. Conversely, Node 2 is unaffected by the jammer but Hybrid function in Node 2 has chosen the Closed Loop feedback which indicates that Node 2 does have to use a more robust setting to communicate with Node 1.

Inputs
Exemplary inputs to the Hybrid Loop Management function may include:
Closed Loop Monitor Packet:
  F_NSNR: Normalized and filtered SNR
  MD_NSNR: Mean Deviation of NSNR
  R_NSNR: Rate of Change of NSNR
  F_NSER: Normalized and filtered SER
  MD_NSER: Mean Deviation of NSER
  R_NSER: Rate-of-change of NSER
  Last_Time: Time Stamp of when the last observations was made (there may have been a period before the monitor packet was constructed whereas the filter did not make a measurement/observation)
Open Loop Metrics:
  F_NSNR: Normalized and filtered SNR
  MD_NSNR: Mean Deviation of NSNR
  R_NSNR: Rate of Change of NSNR
  F_NSER: Normalized and filtered SER
  MD_NSER: Mean Deviation of NSER
  R_NSER: Rate-of-change of NSER
Outputs
Exemplary outputs from the Hybrid Loop Management function may include:

Loop_Select: Loop selection indicator (0=Closed Loop; 1=Open Loop)

Idle_Alarm: Set high to indicate that both loops have timed out and an emergency monitor packet should be sent to the peer node (may not be indicated if NiB frequency is sufficient)

CL_valid: Closed Loop validity indicator, 0=Invalid; 1=Valid

OL_valid: Open Loop validity indicator, 0=Invalid; 1=Valid

F_NSNR: Selected Normalized and filtered SNR

MD_NSNR: Selected Mean Deviation of NSNR

R_NSNR: Selected Rate of Change of NSNR

F_NSER: Selected Normalized and filtered SER

MD_NSER: Selected Mean Deviation of NSER

R_NSER: Selected Rate-of-change of NSER

Execution Frequency

The Hybrid function operates on either an Open Loop or Closed Loop (monitor packet) event. However, if the idle monitoring function is utilized, it should be executed periodically even if a loop event has not occurred.

Initialization Parameters

Exemplary initialization parameters for the Hybrid Loop Management function includes:

Closed Loop Latency Tolerance: The factor used to scale the variance for comparison against the Closed Loop latency for Closed Loop validity determination.

Example Use:

if (Current_Time−CL_Last_Time)>(CL_Latency_Factor/Variance);CL_valid=0; end

Max Idle Period: The maximum period allowed between filter updates (either Open or Closed Loop). When this period is exceeded the node may choose to send an emergency monitor packet which provides information to the peer node and request that a Closed Loop packet be returned.

Closed Loop Latch: The Closed Loop is always selected when its link metrics are tending towards a more robust state (metrics are indicating a degrading link). When the Closed Loop Latch configuration bit is selected, the Open Loop cannot be selected if its metrics would tend towards a less robust setting than was indicated by the last Closed Loop Update. When this bit is not set, the Open Loop can "drive" towards a less robust state after the Minimum Number of Observations per State (hysterisis) has been observed.

Algorithms

The pseudo code provided below is exemplary and is not intended to restrict the scope of the claims.

Pseudo Code

```
    CL_valid = 1; % Closed Loop is valid by default
% Closed Loop disqualification based on insufficient feedback rate
% As channel variance increases the tolerance to CL latency should decrease
if (Current_Time − CL_Last_Time) > (Current_Time − OL_Last_Time),
   var = OL_MD_TPreq + 1;
else
   var = CL_MD_TPreq + 1;
end
if (Current_Time − CL_Last_Time) > (CL_Latency_Factor/var);CL_valid = 0;end
OL_valid = 1;
% Open Loop disqualification based on interference (reference for future use)
%if ((−OL_R_SNR > −SNR_Rate_Factor) && (OL_R_RSSI > RSSI_Rate_Factor)) || ...
%   ((OL_F_SNR < SNR_Low_Bound) && (OL_F_RSSI > RSSI_Bound_Factor)),
%  OL_valid = 0;
%end
% Monitor Loop activity for excessive period of idle time (a configurable number)
Idle_Alarm = 0;
if (Current_Time − CL_Last_Time) > Loop_Max_Idle_Period && (Current_Time −
OL_Last_Time) > Loop_Max_Idle_Period,
   Idle_Alarm = 1;
end
if (CL_valid), Loop_Select = 0; end; % select Closed Loop
if (~CL_valid && OL_valid), Loop_Select = 1; end; % select Open Loop
if (~CL_valid && ~OL_valid),
   Loop_Select = 0; % select Closed Loop with condition
   Idle_Alarm = 1; % Requests emergency Monitor packet be sent to get update
end
% Transfer metrics from selected loop along with loop qualifiers to the State Transition
function
if Loop_Select,
sys = [ Loop_Select Idle_Alarm CL_valid OL_valid...
OL_F_TPreq ...
OL_MD_TPreq ...
OL_R_TPreq ...
OL_F_SER ...
OL_MD_SER ...
OL_R_SER ...
OL_Delta_T ...
OL_Last_Time];
else
sys = [ Loop_Select Idle_Alarm CL_valid OL_valid...
CL_F_TPreq ...
CL_MD_TPreq ...
CL_R_TPreq ...
```

-continued

| Pseudo Code |
|---|
| CL_F_SER ...<br>CL_MD_SER ...<br>CL_R_SER ...<br>CL_Delta_T ...<br>CL_Last_Time];<br>end |

State Transition

The State Transition function 850 receives metric outputs (e.g., normalized SNR and SER, and RSSI) from the Hybrid function and uses these metrics as "trip points" within a pre-loaded State Transition Table. In one exemplary embodiment, the State Transition Table controls the sensitivity, throughput vs. efficiency goals, and overall process behavior of link adaption process Inputs Exemplary inputs to the State Transition function may include:
Loop_Select: Loop selection indicator (0=Closed Loop; 1=Open Loop)
Idle_Alarm: Set high to indicate that both loops have timed out and an emergency monitor packet should be sent to the peer node (may not be indicated if NiB frequency is sufficient)
CL_valid: Closed Loop validity indicator, 0=Invalid; 1=Valid
OL_valid: Open Loop validity indicator, 0=Invalid; 1=Valid
F_NSNR: Selected Normalized and filtered SNR
MD_NSNR: Selected Mean Deviation of NSNR
R_NSNR: Selected Rate of Change of NSNR
F_NSER: Selected Normalized and filtered SER
MD_NSER: Selected Mean Deviation of NSER
R_NSER: Selected Rate-of-change of NSER Outputs Exemplary outputs from the State Transition function may include:
Mod_Type: Modulation Type
Diversity Type: 0=none, 1=Repetition, 2=Codeword
Diversity Level: 1-5 depending on receiving hardware
FEC rate: As per receiving hardware
Frequency_Spreading: Frequency spreading factor (only for OFDM, 1 for other receiving hardware)
NOTE: The parameters above imply a Rate at the receiving hardware level—the receiving hardware is already configured with the allocated bandwidth. These parameters can therefore be combined into a single "Index" that is sent to the receiving hardware. Tx Power must still be called out separately.
TX_Pwr: Tx Power (dbm)
SNR_Div_Cmb: Combining technique to be used by the Normalization function when combining the individual receiving hardware diversity channel SNR measurements
SER_Div_Cmb: Combining technique to be used by the Normalization function when combining the individual receiving hardware diversity channel SER Execution Frequency The State Transition function operates on either an Open Loop or Closed Loop event.

Initialization Parameters

Exemplary initialization parameters for the State Transition function may include:
State Transition Table: As depicted in FIG. 1 where an exemplary table is shown.
Bandwidth: Allocated channel bandwidth. Since actual power levels and margin numbers are specified in the State Transition Table it is necessary to scale these by the actual hardware bandwidth. It is possible to load a unique table for a given channel bandwidth, but is probably preferred to have the table scaled at initialization time.
Min_Obs: Minimum Number of Observations per State
Num_Deviations: The number of deviations to be added to the mean. This is currently specified for each state but should be considered as a general configuration parameter.
SI_Gain: Stability Indicator Gain Algorithms Exemplary algorithms for the State Transition function may include the following:

Pseudo Code

The pseudo code provided below is exemplary and is not intended to restrict the scope of the claims.

| State Transition Table Handling |
|---|
| if State_Cnt > Min_Obs,   % Make parameter - min_time_in_state<br>%=== Derivation of normalization procedure<br>% SNR = TP − PL − NoI     <== performed in Normalization<br>% NSNR = SNR − TP = −PL − NoI   <== performed immediately below<br>% TPreq = C/N − NSNR = C/N + PL + NoI   <== Predicted Required TX Power performed in State Transition<br>% =====================<br>% SER => SNReq<br>% NSER = SNReq − TXpwr         <== performed in Normalization<br>% MARGINest = NodeTX_Pwr + NSER = NodeTX_Pwr − PLest − NOIest<br>if (C_N − H_F_NSNR + H_MD_NSNR * STT(11,Current_State)) > STT(10,Current_State),<br>   Current_State = STT(12,Current_State);<br>elseif (C_N − H_F_NSNR + H_MD_NSNR * STT(14,Current_State)) < STT(13,Current_State), |

-continued

State Transition Table Handling

```
  Current_State = STT(15,Current_State);
elseif(Node_TX_Pwr + H_F_NSER - H_MD_NSER * STT(17,Current_State)) <
STT(16,Current_State),
  Current_State = STT(18,Current_State);
elseif (Node_TX_Pwr + H_F_NSER - H_MD_NSER * STT(20,Current_State)) >
STT(19,Current_State),
  Current_State = STT(21,Current_State);
end
if Current_State ~= Prev_State,
  Prev_State = Current_State;
  State_Cnt = 0;
End
```

Stability Indicator Calculation

```
if Rindx > Min_Obs,Rindx = 1;end
TPreq_est = C_N - H_F_NSNR;
TPreq_MD = C_N - H_F_NSNR + H_MD_NSNR * STT(11,Current_State); % Note:
deviation is added to RSNRbuf(Rindx) = H_F_NSNR;
RSNRbuf(Rindx) = TPreq_MD;
% Compute Margin stability number 0 - 1
MARGIN_est = Node_TX_Pwr + H_F_NSER;
MARGIN_MD = Node_TX_Pwr + H_F_NSER - H_MD_NSER * STT(20,Current_State);
% Note deviation is subtracted
RSERbuf(Rindx) = MARGIN_MD;
RTimebuf(Rindx) = Current_Time;
Rindx = Rindx + 1;
% Compute TPreq stability number 0 - 1
T = STT(10,Current_State);   % Upper Trip Point
B = STT(13,Current_State);   % Lower Trip Point
D = TPreq_MD;         % Mean + N*Dev
S = TPreq_est;        % Mean
DeltaT = max(RTimebuf) - min(RTimebuf);
MRate = 0.125*(max(RSNRbuf)-min(RSNRbuf))/DeltaT;
MS = mean(RSNRbuf);
if MRate ~= 0,
   if abs(T-D) < abs(D-B)
      TPperiod = (T-MS)/MRate;   % Estimate time until nearest trip point
   else
      TPperiod = (MS-B)/MRate;
   end
else
   TPperiod = 0;
end
TPstab = TPstab + 0.5*(TPperiod-TPstab);
```

Unidirectional Monitoring

In accordance with an exemplary embodiment, if a Node is only receiving without transmitting data of it's own, the State Transition function should still be run on the Open Loop measurements and contention slots utilized to send emergency information packets to the transmitting node when the link is considered to be in jeopardy as reported by the State Transition function.

While the detailed drawings, specific examples and particular formulations given describe preferred and exemplary embodiments, they serve the purpose of illustration only. The inventions disclosed are not limited to the specific forms shown. For example, the methods may be performed in any of a variety of sequence of steps. The hardware and software configurations shown and described may differ depending on the chosen performance characteristics and physical characteristics of the computing devices. For example, the type of computing device, communications bus, or processor used may differ. The systems and methods depicted and described are not limited to the precise details and conditions disclosed. Furthermore, other substitutions, modifications, changes, and omissions may be made in the design, operating conditions, and arrangement of the exemplary embodiments without departing from the scope of the invention as expressed in the appended claims.

What is claimed is:

1. A method of selecting link metric measurements from at least one of open loop and closed loop measurements associated with a radio communication sent by a first node, the method comprising:

receiving by a second node the first radio communication over a communication link; and estimating by the second node the dynamics and condition of the communications channel using at least one of the variance and mean deviation of link metric measurements, the link metric measurements being comprised of at least one of symbol error rate (SER), packet error rate (PER), frame error rate (FER), bit error rate (BER), signal to noise ratio (SNR), and received signal strength (RSS), wherein the link metric measurements are normalized via at least one of the following methods:

subtraction of transmitted power for a normalization of the SNR and RSS; and a table look-up of transformation for a normalization of the SER, PER, or FER from one modulation type to another when more than one modulation type is used.

2. The method of claim 1, further comprising:

sending by the second receiver, the link metric measurements back to the first node which uses them as its closed loop measurements; and categorizing the dynamics of the communications channel into one of at least two groups, based on the estimates.

3. The method of claim 1, wherein the categorizing step uses estimates from more than one link when multiple nodes are to be communicated with simultaneously; and selecting, based on the chosen group, the use of at least one of closed loop link adaption and open loop link adaption of communication link parameters.

4. The method of claim 1, generating by a state transition table at least one of the transmitted power, modulation type, forward error correction coding gain, diversity level, diversity method, diversity combing method, and frequency spreading.

5. The method of claim 1, wherein both open loop and closed loop link measurements are selected.

6. The method of claim 5, wherein the open loop and closed loop link measurements are combined in a weighted sum.

7. The method of claim 6, wherein the weighted sum is based on an interval between updates and the variance of the link metric measurements.

8. The method of claim 1, wherein the channel estimates of the Open Loop are chosen when the ratio of a time interval between updates divided by one of the variance and mean deviation of the link metric measurements falls below a preset value.

9. The method of claim 1, wherein the estimates of the closed loop group are chosen when the ratio of a time interval between updates divided by one of the variance and mean deviation of the link metric measurements exceeds a preset value.

10. The method of claim 1, further comprising:

disqualifying the open loop estimates based on the output of an interference detection process.

11. The method of claim 1, further comprising:

requesting closed loop measurements when the interval between closed loop measurements exceeds a preset value.

12. The method of claim 1, further comprising:

combining link quality measurements made on multiple diversity channels.

13. A method of changing communication link adaption techniques in a network of radio communication nodes, comprising:

detecting interference based on an open loop metric;

estimating using an open loop estimator, the channel dynamics;

determining, whether transmission parameters should be adjusted based on open loop metrics or closed loop metrics, based on the channel dynamics; and adjusting transmission parameters by using a state transition table based on the estimate; and generating by the state transition table at least one of transmit power, modulation type, forward error correction coding gain, diversity level, diversity method, diversity combing method, and frequency spreading.

14. The method of claim 13, further comprising:

estimating using a closed loop estimator, the channel dynamics.

15. The method of claim 13, further comprising:

wherein the loop metrics are normalized.

16. The method of claim 13, further comprising:

scaling the open loop metric.

17. The method of claim 16 wherein a scaling factor is derived from the state transition table.

18. The method of claim 16, wherein a scaling factor is generated based on auxiliary inputs.

19. The method of claim 18, wherein auxiliary inputs are at least one of a vehicle speed, a vehicle type, and a link closure rate.

20. The method of claim 13, wherein the state transition table is specific to the environment in which the link adaption is performed.

21. A method of specifying link quality associated with a first radio communication sent by a first node, the method comprising:

receiving by a second node the first radio communication;

estimating by the second node the dynamics of the communications channel using at least one of the variance and mean deviation of link metric measurements;

transmitting the metric measurements from the second node back to the first node thus comprising the closed loop metrics for the first node;

categorizing the dynamics of the communications channel into one of at least two groups, based on the estimate of more than one link when multiple nodes are to be communicated simultaneously;

selecting, based on the chosen group, the use of at least one of closed loop link adaption and open loop adaption of communication link parameters; and determining link quality based on the estimate and the selection, wherein the link metric measurements being comprised of at least one symbol rate error (SER), packet error rate (PER), frame error rate (FER), signal to noise ratio (SNR), and received signal strength, wherein the link metric measurements are normalized via at least one of the following methods:

subtraction of transmitted power for a normalization of the SNR and RSS; and a table look-up of transformation for a normalization of the SER, PER, or FER from one modulation type to another when more than one modulation type is used.

22. The method of claim 21, wherein the link quality comprises an indication of the probability of a correct packet transmission.

23. The method of claim 22, wherein the probability is based on a symbol error rate.

24. The method of claim 21, wherein the link quality comprises an indication of link capacity based on the communication link parameters.

25. The method of claim 21, wherein the link quality comprises an indication of link margin.

26. The method of claim 21, wherein the link quality comprises an indication of link stability.

27. The method of claim 21, wherein the link quality comprises an indication of link performance.

28. The method of claim 21, wherein the link quality comprises an indication of expected latency through the link.

29. The method of claim 21, further comprising:
transmitting the metric measurements from the second node back to the first node thus comprising the closed loop metrics for the first node.

30. The method of claim 21, wherein the categorizing step uses estimates of more than one link when multiple nodes are to be communicated simultaneously.

31. The method of claim 21, further comprising:
normalizing the transmit power received by the first node.

32. The method of claim 31, wherein the normalization function utilizes look up table data.

* * * * *